J. P. R. RONFET.
WIRE COUPLING.
APPLICATION FILED MAY 2, 1912.

1,044,249.

Patented Nov. 12, 1912.

Inventor
Jean Philippe Rémy Ronfet.

UNITED STATES PATENT OFFICE.

JEAN PHILIPPE REMY RONFET, OF PARIS, FRANCE.

WIRE-COUPLING.

1,044,249.   Specification of Letters Patent.   Patented Nov. 12, 1912.

Application filed May 2, 1912. Serial No. 694,790.

*To all whom it may concern:*

Be it known that I, JEAN PHILIPPE REMY RONFET, a citizen of the Republic of France, residing at 69 Rue Labat, Paris, France, have invented certain new and useful Improvements in Wire-Couplings, of which the following is a specification.

The object of the present invention is to provide a device by means of which a metallic transmission or other wire may be connected to the member which it is intended to move or to which it is to be coupled, in such a manner that the resistance of the coupling either to a steady or sudden strain shall be at least equal to the resistance of the wire itself.

The characteristic feature of the device resides herein that a block or plate of metal or other suitable material, having suitable means for connecting the member to be moved, is provided with a suitably shaped seating comprising two opposite walls inclined one with respect to the other into which is driven a wedge or key of corresponding form around the periphery of which the end of the transmission wire has been previously bent.

One construction for carrying the invention into effect is illustrated as an example in the accompanying drawing, in which—

Figure 1:
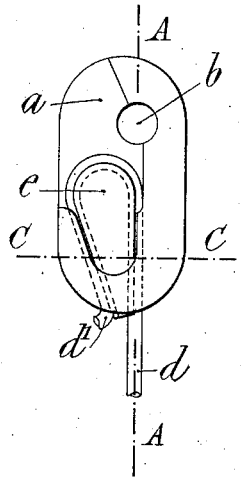
Figure 2:
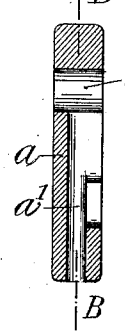
Figure 3:
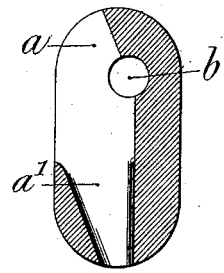
Figure 4:
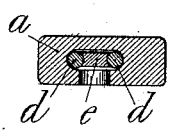
Figure 5:
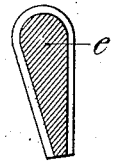
Figure 6:

Figure 1 is a front elevation of the coupling device showing the end of the transmision wire bent around the wedge and secured in position. Fig. 2 is a section on the line A—A of Fig. 1, with the wire and wedge removed. Fig. 3 is a section on the line B—B of Fig. 2. Fig. 4 is a section on the line C—C of Fig. 1; and Figs. 5 and 6 show respectively a section on the line D—D of Fig. 6, and a top plan view of the wedge in detail.

Referring to the drawing, the device comprises a piece or block $a$ of metal or other suitable material which will generally take the outward form of a link of a chain. In this piece is provided means suitable for coupling or pivotally connecting the member which the wire is intended to move or entrain or to which it is to be coupled, the means shown in the drawing comprising the hole $b$ formed in the block $a$. The piece $a$ is shaped or slotted so as to permit of the end of the wire $d$ being readily inserted after it has been rolled around the periphery of a wedge or key $e$. The wedge $e$ is preferably provided with a rounded base and its thickness is slightly less than or equal to the diameter of the wire, while its periphery is preferably provided with a groove $e'$ forming a bed for the bent wire. The wedge with the loop formed by the end of the wire bent thereon are together driven into a seating $a'$ of corresponding shape provided in one of the lateral faces of the piece $a$ at the end opposite to that at which the piece is to be connected to the member to be entrained or coupled. In the example illustrated the seating $a'$ is formed midway in the thickness of the piece $a$ while the hole $b$ to be utilized for connecting the member to be entrained is arranged so as to be intersected by the prolonged axis of that portion of the wire $d$ which is in tension; in other words, the axis of the hole $b$ is located in the geometrical axis of the wire $d$, as shown in Fig. 1.

As clearly shown on the drawing the seating $a'$ is cut out of the metal, while it is of full width below the seating on one side of the center line of the piece, while on the other side it is cut away to allow the ready insertion and withdrawal of the bent wire and of the wedge $e$. When the wire $d$ and wedge $e$ have been placed in position and properly wedged tight the end $d'$ of the wire can be slightly bent over and then cut off close to the piece $a$. Any relative movement, as between the piece $a$ on the one hand and the wire and wedge on the other hand, then becomes impossible. If care has been taken to arrange the hole $b$ as shown on the drawing then no tensile strain on the wire can free the latter, the greater the pull on the free end of the wire the tighter the wedge will grip. On the other hand the two-fold wedging of the wire between the wedge and the walls of the seating $a'$ insures a joint with a resistance at least equal to that of the wire itself.

Another important advantage of the device is that it may be made relatively very small and with a curved outline, thus tending to prevent its catching in obstructions. Finally it can be easily and rapidly put together without in any way depreciating the strength of the coupling.

The device described is particularly advantageous for connecting the wires of railway signals, wires which, at present, nearly always break at their joints or connecting points.

What I claim and desire to secure by Letters Patent is:—

1. A wire coupling device embodying therein a block having a transverse opening therethrough near one of its ends and a longitudinal aperture at its opposite end through which a wire is adapted to be inserted, a recess formed in one of the side faces of the block at one side of the central longitudinal axis of the block, said recess communicating with said aperture, and a wedge adapted to have wire looped over its periphery, said wedge being adapted to enter the recess and retain the main body of the wire against one wall of said recess so that the central longitudinal axis of the wire alines with the center of the transverse opening in the block.

2. A wire coupling device embodying therein a block having a transverse opening therethrough near one of its ends and a longitudinal aperture at its opposite end through which a wire is adapted to be inserted a recess in said block having a straight wall substantially in alinement with the center of said opening and a second wall inclined with respect to the first named wall, said recess communicating with said aperture, and a wedge adapted to have wire looped over its periphery and to enter said recess, said wedge having its walls shaped to conform to the walls of the recess and being adapted to retain the main body of the wire in direct alinement with the center of the transverse opening.

In testimony whereof I have affixed my signature in presence of two witnesses.

JEAN PHILIPPE REMY RONFET.

Witnesses:
HENRI MONIN,
H. C. COXE.

---

Copies of this patent may be obtained for five cents each, by addressing the "Commissioner of Patents, Washington, D. C."